United States Patent [19]
Wittman

[11] Patent Number: 5,215,188
[45] Date of Patent: Jun. 1, 1993

[54] SECURITY PACKAGE WITH A SLIDABLE LOCKING MECHANISM

[75] Inventor: Boyd C. Wittman, Shorewood, Minn.

[73] Assignee: Empak, Inc., Shakopee, Minn.

[21] Appl. No.: 840,016

[22] Filed: Feb. 24, 1992

[51] Int. Cl.$^5$ .................... B65D 85/57; B65D 85/672
[52] U.S. Cl. .................................. 206/1.5; 206/309;
206/387; 206/807
[58] Field of Search ............... 206/1.5, 387, 807, 309;
211/40, 41; 70/63, 58

[56]       References Cited
        U.S. PATENT DOCUMENTS

| | | |
|---|---|---|
| 3,828,922 | 11/1974 | Hoikestad . |
| 3,871,516 | 3/1975 | Holkestad et al. . |
| 4,285,429 | 8/1981 | MacTavish ..................... 206/387 |
| 4,572,369 | 2/1986 | Morris . |
| 4,589,549 | 5/1986 | Hehn ................................ 206/387 |
| 4,634,004 | 1/1987 | Mortensen . |
| 4,759,442 | 7/1988 | Gregerson et al. ................. 206/387 |
| 4,760,914 | 8/1988 | Gelardi et al. . |
| 4,805,769 | 2/1989 | Soltis et al. ........................ 206/309 |
| 4,834,238 | 5/1989 | Hehn et al. ....................... 206/387 |
| 4,850,477 | 7/1989 | Gelardi et al. ................ 206/387 X |
| 4,865,190 | 9/1989 | Gregerson et al. ................ 206/309 |
| 4,871,065 | 10/1989 | Hehn et al. . |
| 4,881,645 | 11/1989 | Smiler et al. ..................... 206/387 |

FOREIGN PATENT DOCUMENTS 2223219 4/1990 United Kingdom ................ 206/387

Primary Examiner—Bryon P. Gehman
Attorney, Agent, or Firm—Haugen and Nikolai

[57] ABSTRACT

A security package having a slidable locking structure to retain a CD, cassette or the like in the security package. The slidable locking structure has a stationary surface which contains a T-shaped protrusions each having a lever arm. A slide plate contains recesses for receiving each end of the lever arm, apertures adjacent to these recesses and a lip along an edge. The security package is locked when the slide plate is slid to engage the lever arms into the recesses allowing the lip to extend over the holding structure to retain the CD, cassette or the like. A key which mates with the apertures is used to apply a simultaneous uniform force to release the lever arms from the recesses.

7 Claims, 9 Drawing Sheets

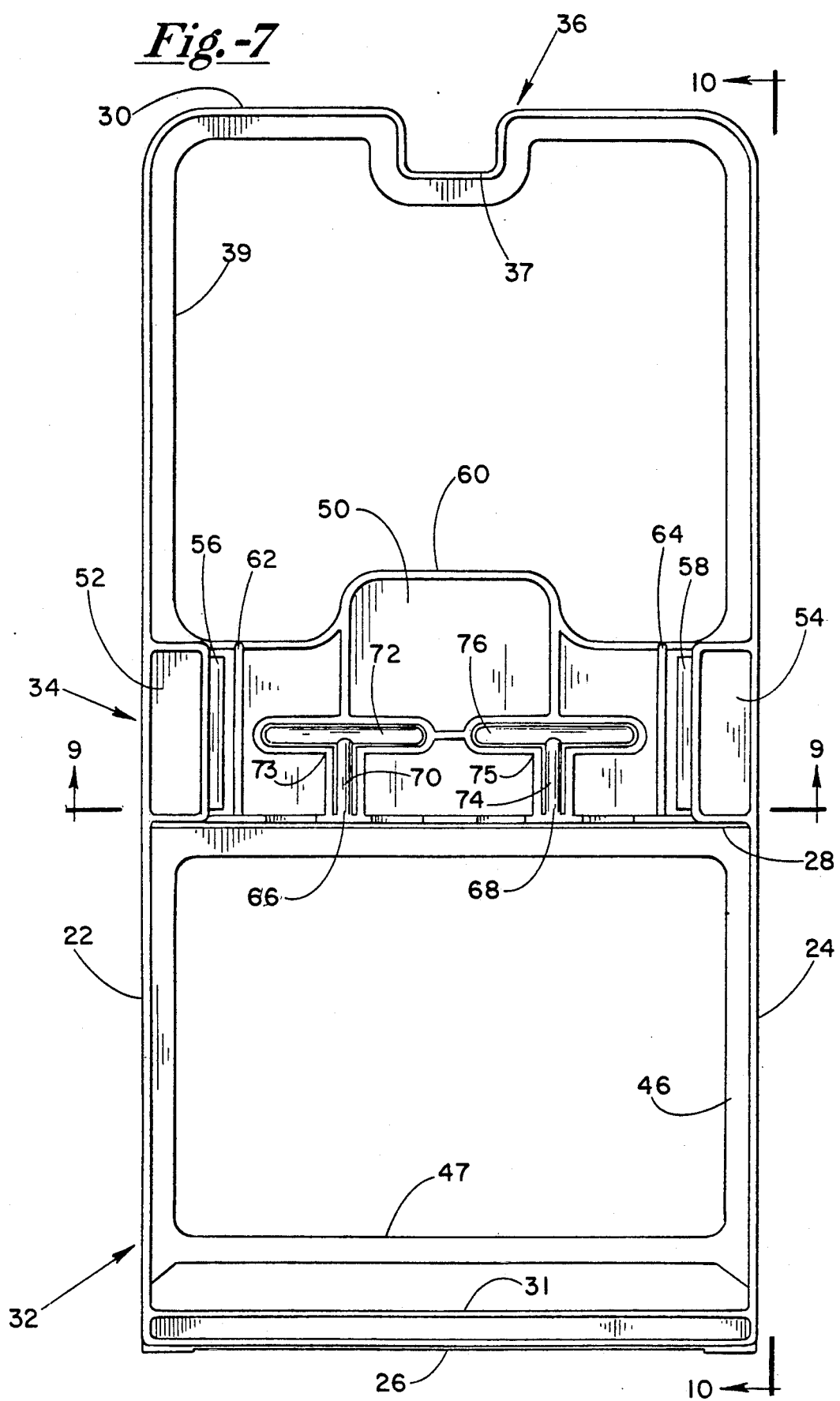

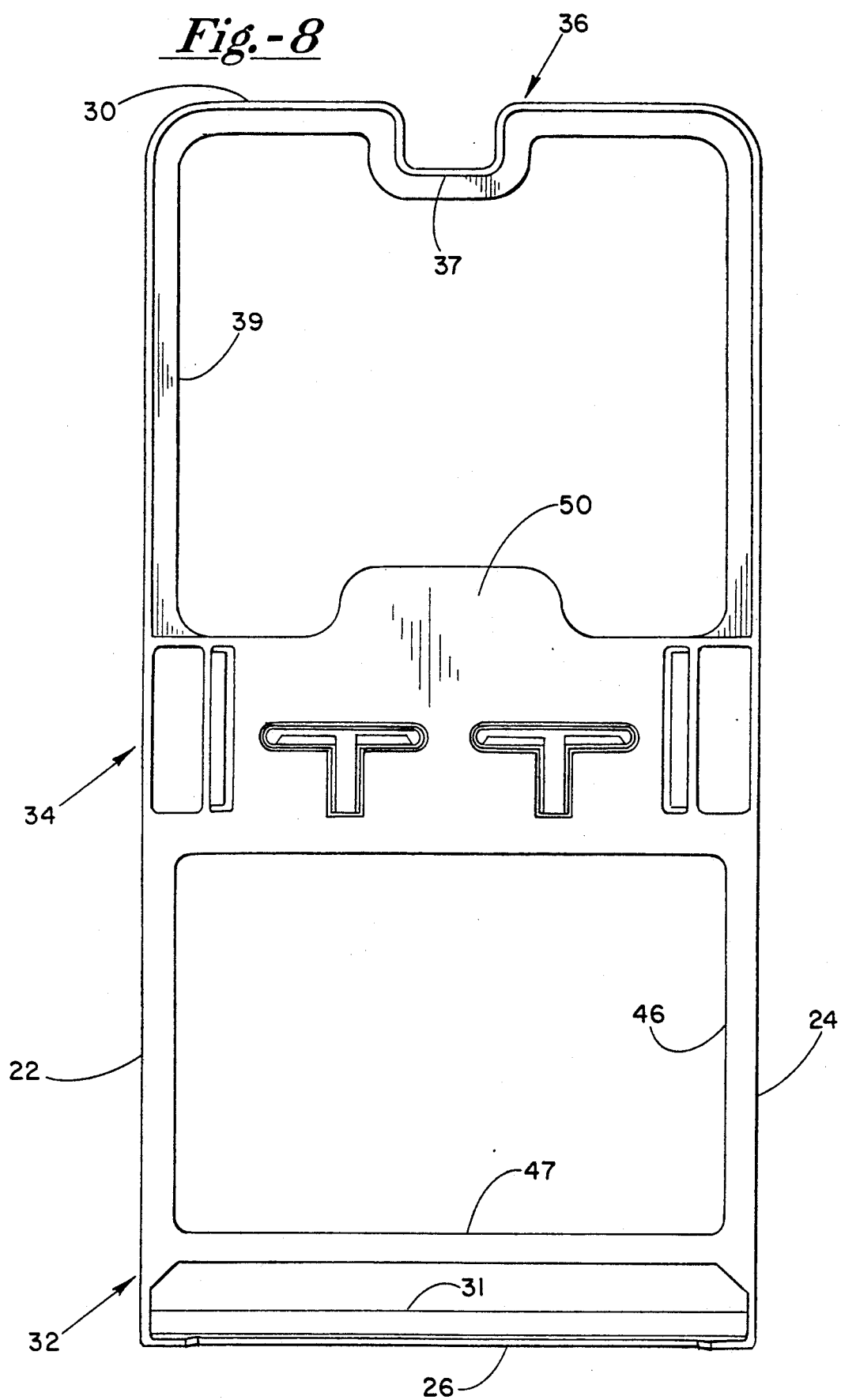

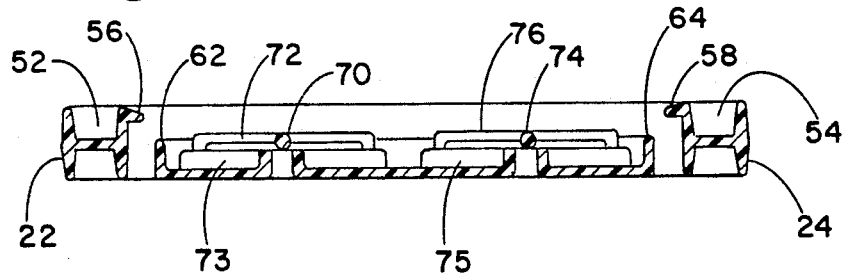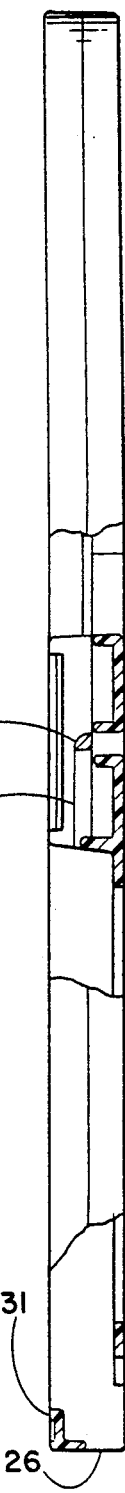

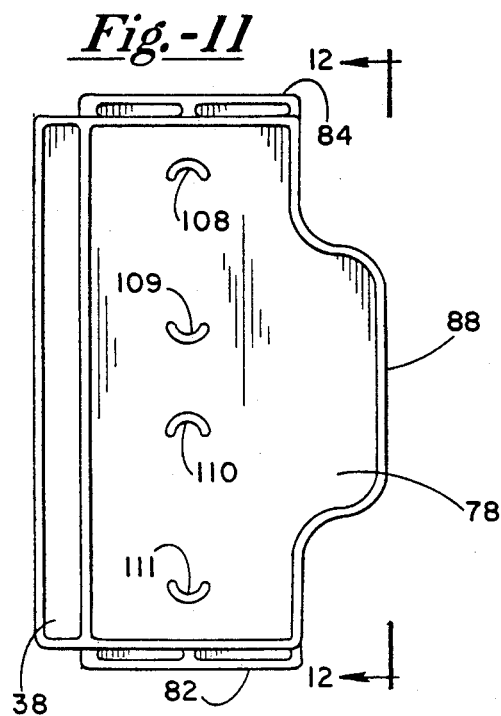
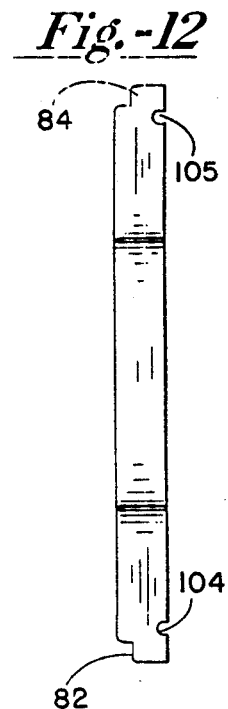
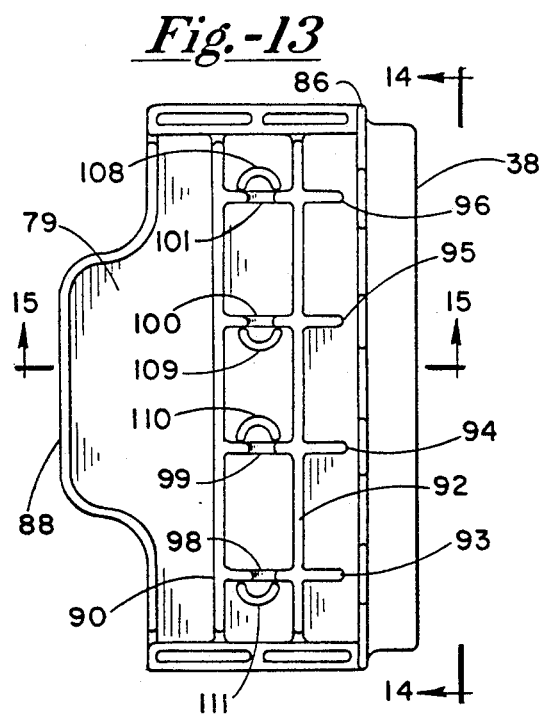
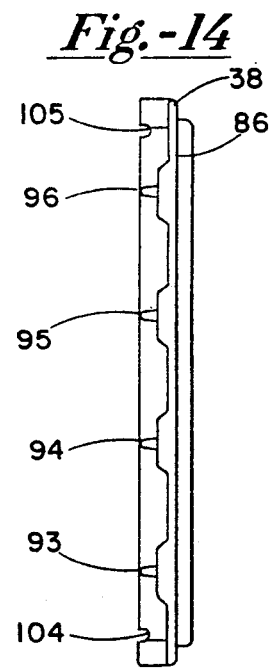
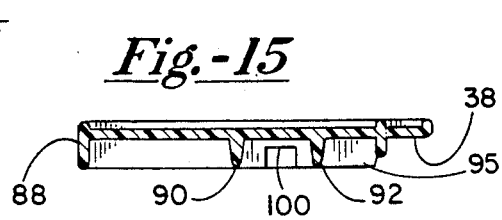

SECURITY PACKAGE WITH A SLIDABLE LOCKING MECHANISM

FIELD OF THE INVENTION

The present invention relates to a security package for audio or visual storage media such as tape cassettes or compact discs. More particularly, it relates to a security package with a slidable locking mechanism.

BACKGROUND OF THE INVENTION

Sellers of cassettes and compact discs (CDs) have used security packages in their efforts to prevent theft of cassettes and CDs. Security packages tend to be large frame structures which inhibit an individual's ability to hide the cassette or CD in the security package within a package or under clothing. These security structures also have a means to securely hold the cassette or CD within the frame.

Several types of security packages require the use of an instrument to destroy the frame's structure in order to remove the cassette or CD. Other types of security packages are reusable. The reusable packages may or may not have locking devices. Those such as shown in U.S. Pat. No. 4,881,645 disclose sliding in the tape cassette or CD held in place by resilient tabs. The CD or cassette is removed by depressing the tabs.

Security packages which have a locking mechanism have a second frame member which locks onto the first frame member and retains the cassette or CD in an opening in a first frame member. The second frame member is optimally attached to the locking mechanism. These device often require a key mechanism for removing the second frame member. Furthermore, individuals have been able to open such security packages with pointed objects by prying the locking mechanism open and then removing the cassette or CD.

Therefore, what is needed is a security locking device which cannot be pried open and which can be displayed in an orderly fashion.

OBJECTS

The primary object is to provide a security package with a locking mechanism which required simultaneous application of a uniform force to disengage the locking mechanism.

Another object is to provide a reusable security package with a slidable locking mechanism that is easy to engage.

Still another object is to provide a security package which cannot be pried open.

SUMMARY OF THE INVENTION

The present invention is a security package have an elongated rectangular frame structure and a locking structure to lock an object within the frame structure. A locking structure found particularly advantageous in preventing theft includes a first member with a T-shaped protrusion wherein the cross arm of the T-shaped protrusion operates as a lever arm. The first member also has a guide slot. A second member, separate from the first member, has a pair of aligned recesses which mate with the two ends of the lever arm. A lip extends from the edge of the second member which also contains a guide rail for slidably engaging the guide slot of the first member. The second member additional contains a plurality of apertures in the second member adjacent to the recesses.

The security package is in its locked position when the lever arms of the first member engage the recesses of the second member. When the lever arms are thus engaged the lip extends over the object being held within the frame structure. When the lever arms are not engaged within the recesses and the lip does not extend over a portion of the object being held the security package is in an unlocked position.

A key which mates with the plurality of apertures in the second member is used to release the lever arms from the recesses. Because of the nature of the lever arms they can only be released when a uniform force is applied by a key at equal distances from the center of the lever arm. This design makes it very difficult to open the locking mechanism with a pointed object such as a screw driver or an ice pick. Packages of this design are only easily opened with the special key designed to actuate the lever arm.

The security package can be adapted to be used in conjunction with a display system for one or more objects and tape cassettes. This display system includes a rack having two bars for attaching the rack to conventional CD or cassette display basket. This rack consists of a main bar with a plurality of cross bars spaced about the main bar. Security packages engage the main bar of the rack between a pair of cross bars and can be pivoted in that position by a consumer.

BRIEF DESCRIPTION OF THE DRAWINGS

Other objects, features and advantages of the present invention will become apparent to those skilled in the art through the Description of the Preferred Embodiment, claims, and drawings herein wherein like numerals refer to like elements.

FIG. 7 is a top view of the security package of the preferred embodiment.

FIG. 8 is a bottom view of the security package of the preferred embodiment.

FIG. 9 is a cross-section taken through line 9—9 in FIG. 7.

FIG. 10 is a cross-section taken through line 10—10 of FIG. 7.

FIG. 11 is a top view of the slide plate of the security package of the preferred embodiment.

FIG. 12 is a front view of the slide plate of the security package of the preferred embodiment.

FIG. 13 is a bottom view of the slide plate of the security package of the preferred embodiment.

FIG. 14 is a back view of the slide plate of the security package of the preferred embodiment.

FIG. 15 is a cross section taken through section 15—15 of FIG. 7.

DESCRIPTION OF THE PREFERRED EMBODIMENT

Figure 1A:
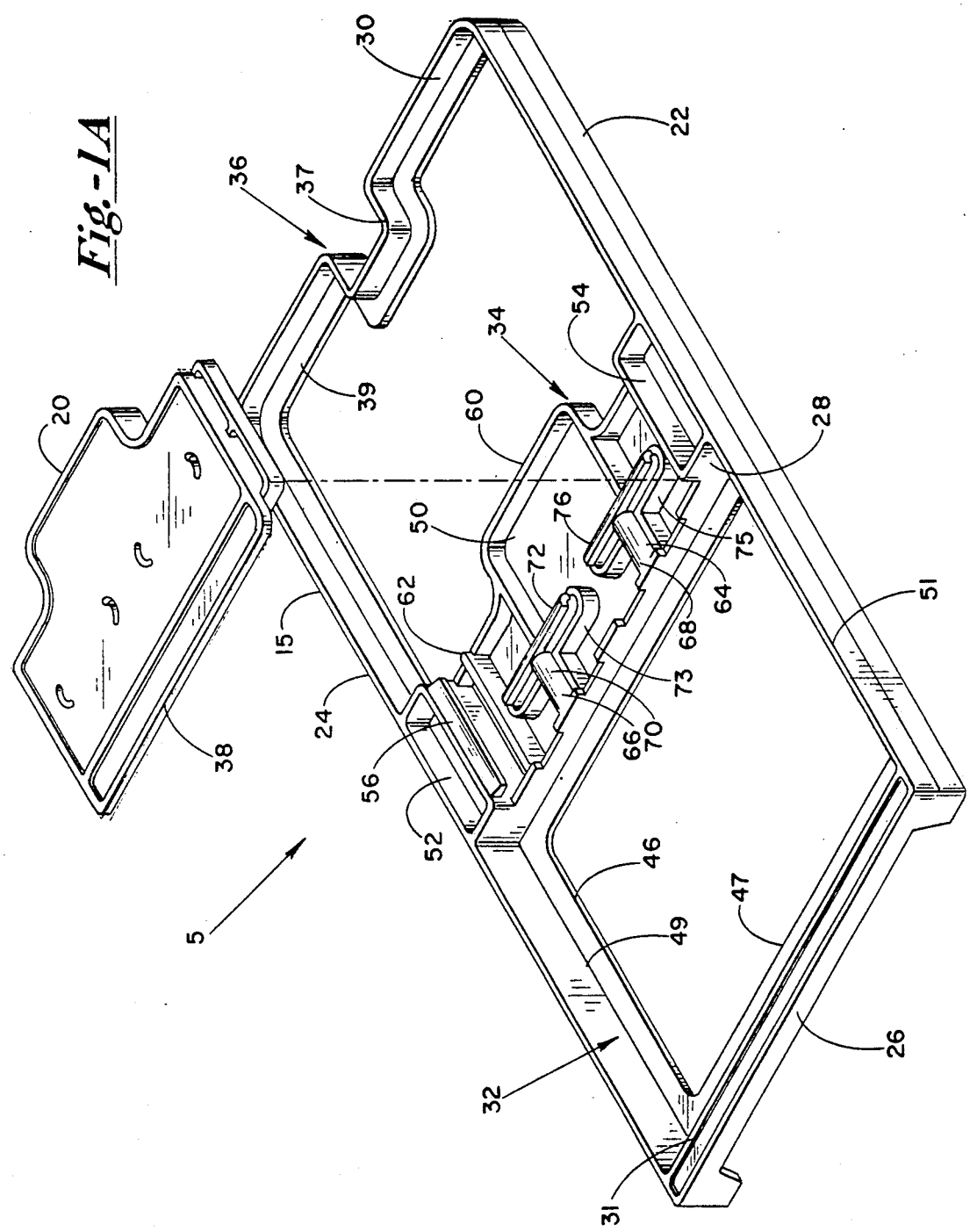
FIG. 1A is a perspective view of the frame and slide plate of the security package of the preferred embodiment.
Figure 1B:
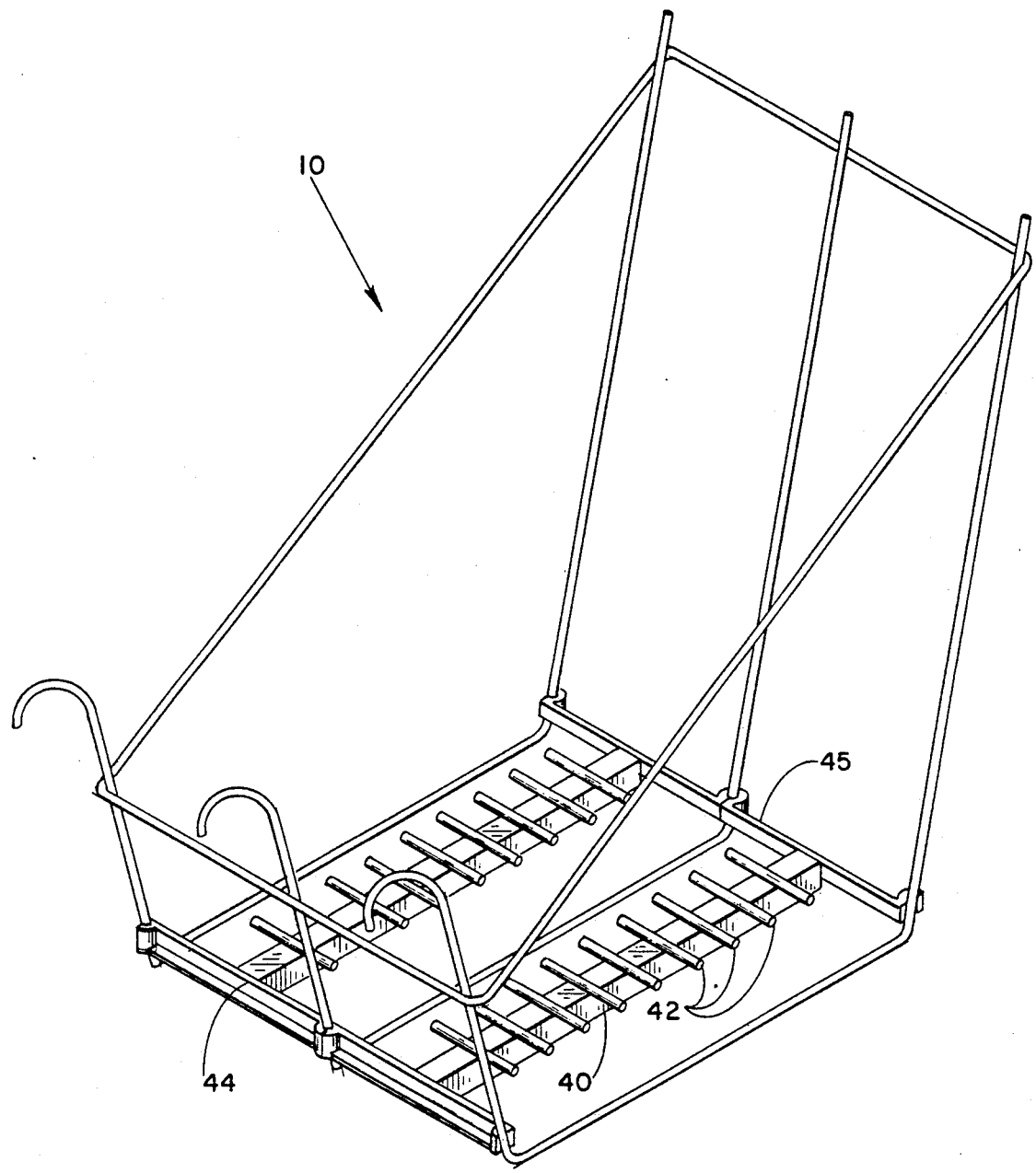
FIG. 1B is a perspective view of two racks used with the present invention.
Figure 5:
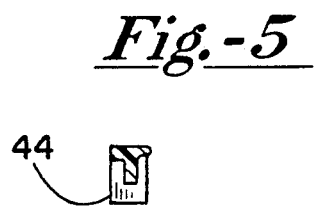
FIG. 5 is a cross-section taken through line 5—5 of FIG. 8.
Figure 6:
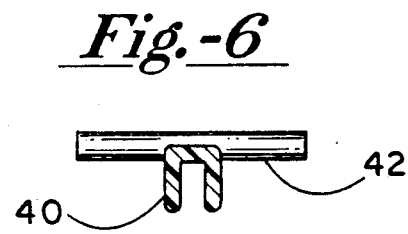
FIG. 6 is a cross-section taken through line 6—6 of FIG. 8.
Figure 16:
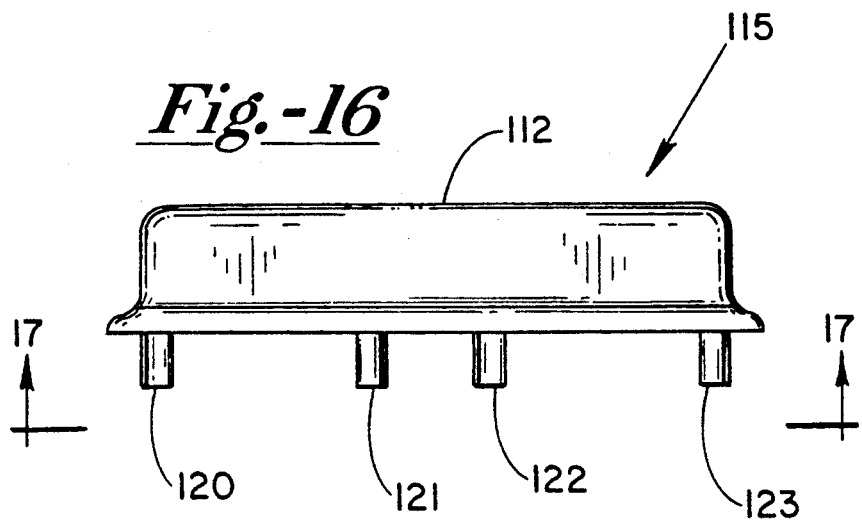
FIG. 16 is a side view of the key for the security package of the preferred embodiment.

As shown in FIG. 1A, the present invention is a security package 5. The security package 5 is one typically displayed within a standard CD display basket of the type found in record stores and the record department of department stores and may be realeasably and pivotally secured to a rack 10. The rack shown in FIG. 1B is intended to accommodate two rows of ten security packages. Rack 10 is shown in FIGS. 3-6. It is sized to fit in commonly known and used CD display baskets. The rack consists of a main bar 40 with a plurality of cross-bars generally designated 42. FIG. 5 shows a cross section of the main bar 40. Each end of the main bar 40 contains an attaching bar 44 and 45. Each attaching bar 44 and 45 has hooks for grasping the display basket as shown in FIG. 6.

Figure 17:
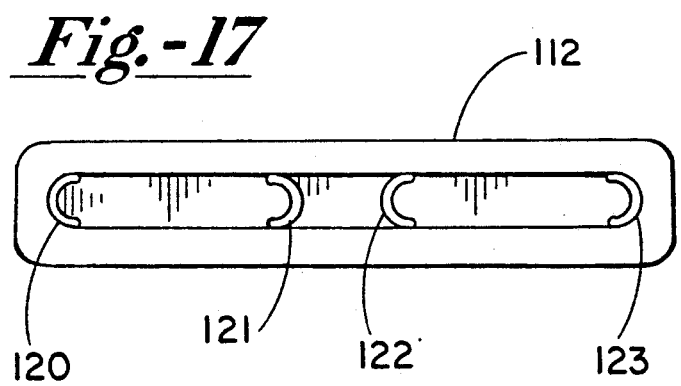
FIG. 17 is a bottom view of the key for the security package of the preferred embodiment.

The security package of the preferred embodiment is shown in FIGS. 7-10. The frame 15 has side walls 22 and 24 with first, second, third walls spanning the frame width at 26, 28 and 30 respectively. The frame has a holding structure 32 for holding a CD, cassette tape or like and, a locking structure 34 which receives the slide plate 20 and may include a rack engaging structure 36 for connecting the frame to the rack 10 as shown in FIG. 17. The slide plate 20 contains a lip 38 that will extend over a portion of the holding structure 32 when in a closed locked position which will be discussed in more detail.

As stated above, the frame 5 has an area 32 for holding a CD, cassette tape or the like. This area is defined by walls 26 and 28 and side walls 22 and 24. A first ledge 46 is located along the inside wall 28, inside of side walls 22 and 24 and further comprises a first bar 47 that extends between the side walls 22 and 24. An opening defined by the ledge 46 has a circumference slightly smaller than the tape, CD or the life object to be held. A second bar 31 extends from wall 26 between the side walls 22 and 24 and is attached to the second edge 51 of these walls. The entire holding structure 32 is of sufficient size that a CD, cassette or the like can be securely retained in the area between the ledge 46, bar 31, side walls 22 and 24, and walls 26 and 28.

The next portion of the frame is the locking structure 34, depicted in FIGS. 7-14. The locking structure has a surface 50 which extends from second wall 28 and side walls 24 and 22. Second wall 28 has a notched edge as shown. Two blocks, 52 and 54, are located on each side of the locking structure adjacent to the side walls. Each block contains a rib, 56 and 58 respectively. A curved border 60 extends between the two blocks 52 and 54 along the edge of surface 50 opposite second wall 28. Rails 62 and 64 are located adjacent to each block 52 and 54. These rails extend between second wall 28 and curved border 60.

Two T-shaped members 66 and 68 are located in the central area of surface 50. Each T-shaped member is located on a base 73 and 75. The first T-shaped member 66 has a stem 70 and lever arm 72. Likewise, T-shaped member 68 has a stem 74 and lever arm 76. Each lever arm has an arcuate shape as shown in FIG. 10. Each T-shaped base is essentially hollow and open to the bottom of surface 50 as shown in FIGS. 8 and 10.

Figure 2:
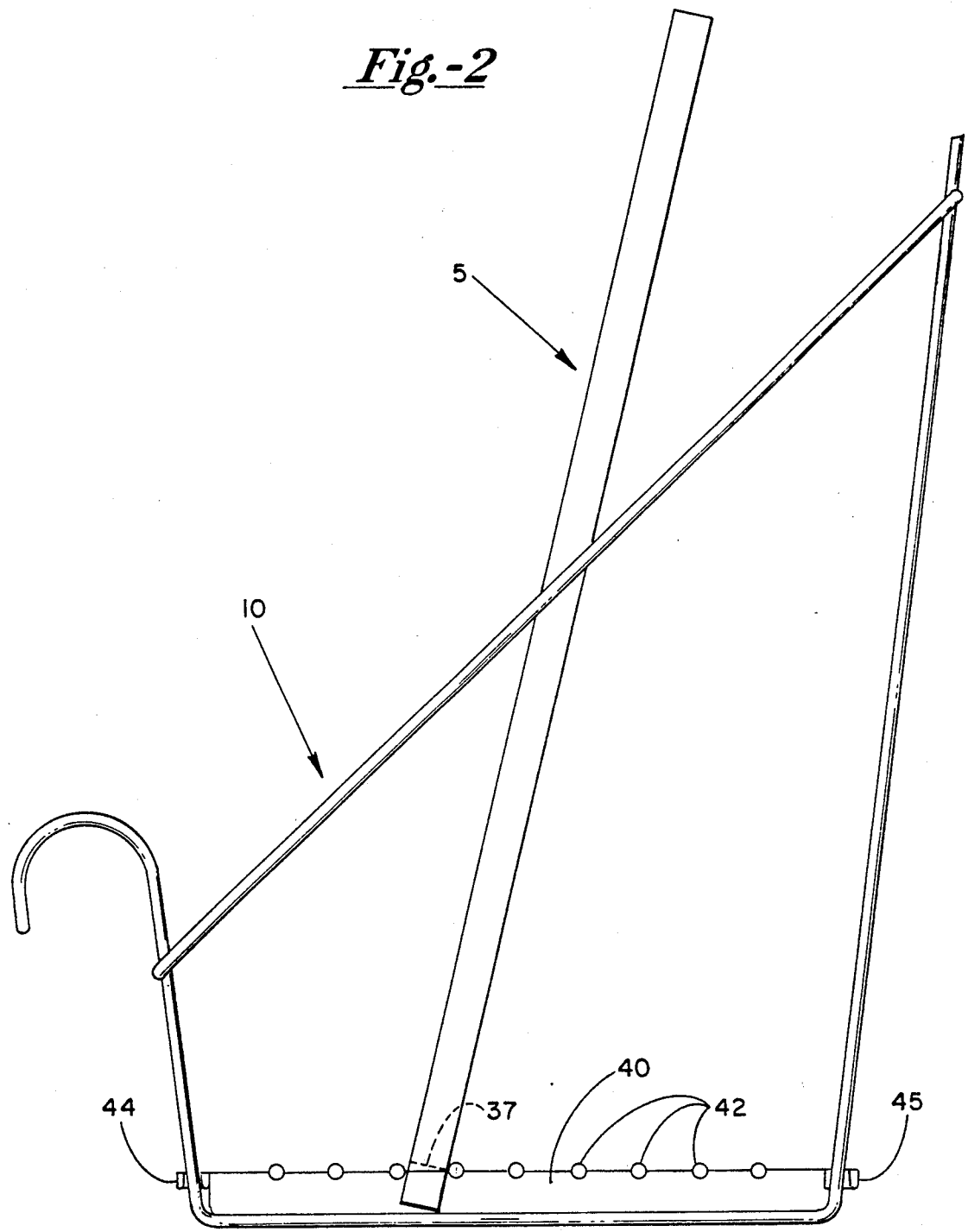
FIG. 2 is a side view of the security package of the preferred embodiment engaging a display rack used with the present invention.
Figure 3:
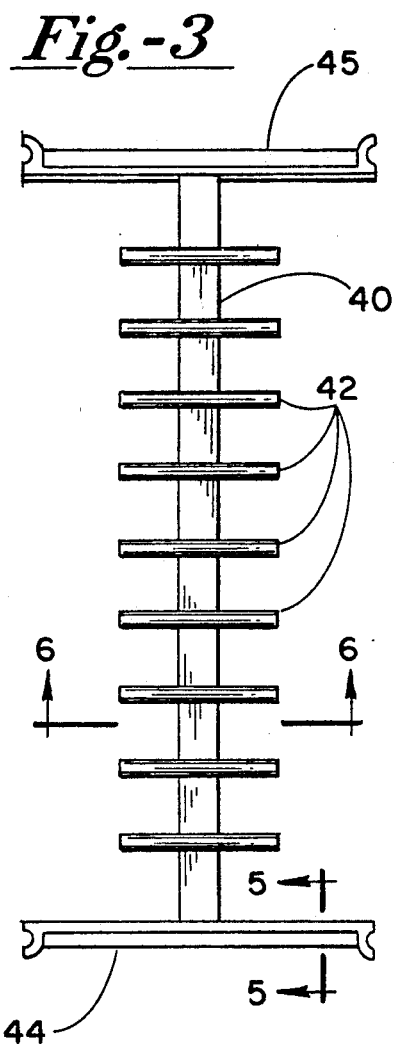
FIG. 3 is a top view of a display rack used with the present invention.
Figure 4:
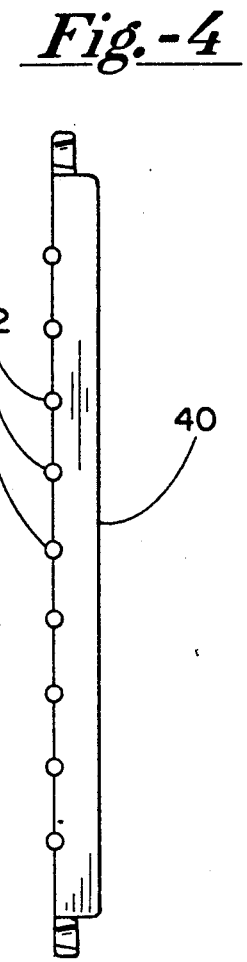
FIG. 4 is a side view of a display rack used with the present invention.

The rack engaging structure 36 for connecting an alternative embodiment of the security package includes a frame. A display rack is located at 36. The third wall 30 has a centrally located U-shaped portion 37. A second ledge 39 extends inside the frame along side walls 22 and 24 and third wall 30. The U-shaped portion 37 engages rack 10 between two cross bars as shown in FIG. 2.

Turning now to slide plate 20 shown in FIGS. 11-14. Slide plate 20 has an exterior surface 78 and an interior surface 79. The slide plate 20 has the general configuration of the locking structure 34 of frame 5. Each side edge of slide plate 2 contains shoulders 82 and 84. A lip 38 extends from the straight end 86. Curved end 88 has a shape which conforms to the locking structure border 60.

The interior surface 79 contains two parallel walls 90 and 92 which extend between the sides edges containing shoulders 82 and 84. Four equally spaced lateral walls 93, 94, 95 and 96 intersect the two parallel walls 90 and 92. Each lateral wall has an identical recess located between the two parallel walls. The lateral wall recesses 98, 99, 100 and 101 are in alignment with one another. Straight end 86 is notched to mate with the notched edge of wall 28. Rail slots 104 and 105 are located along each side of the slide plate and curved wall along the side edges in the form of recesses. Lastly, pairs of semi-circular apertures 108 and 109 and 110 and 111 are located in the base. Each pair are opposing semi-circular apertures equally spaced from the lateral walls. These apertures are transversely aligned with the lateral wall recesses.

The key 115 has a handle 118 and semi-circular protrusions 120-123 which are arranged to mate with the semi-circular apertures located on slide plate 20.

The slide plate 20 attaches to the locking structure of the frame by sliding rails 62 and 64 into the rail slots 104 and 105 on the slide plate such that shoulders 82 and 84 are located underneath the ribs 56 and 58. The slide plate is moved such that the lip 38 extends over a portion of the receiving area 32. The notched edges of straight end 86 and second wall 28 mate forming a smooth surface. The lever arm 72 enters the recesses 98 and 99 located in the lateral walls and lever arm 76 enters recesses 100 and 101. These recesses are spaced such that each engaged side of the lever arm is located at an equal distance from the stem. This position is the locked position. The lip 38, bar 31, walls 26, 24 and 28, and first ledge 46 retain the CD, cassette, or the like in the holding structure.

Once the lever arms 72 and 76 have entered the recesses, the slide plate 20 cannot be removed without utilizing the key 115 to release the lever arms 72 and 76 from the recesses. The lever arms 72 and 76 can only be released if their ends are simultaneously depressed. Thus, in order to remove the entire slide plate, both lever arms must be depressed at the same time on both ends of each lever arm. The key 115 is designed to accomplish this task. The user inserts the four semi-circular protrusions 120 through 123 of the key 115 into the four semi-circular apertures 108-111. By pressing down with the key 112, the ends of the lever arms are released from the recesses. The lever arms cannot be released by prying or releasing one arm end at a time.

Once the lever arms 72 and 74 have been released from the recesses, the slide plate may be slid toward the portion of the frame 36 containing the third wall 30. When lip 38 no longer extends over the holding structure 32, the cassette, CD, or the like, can be removed. The slide plate 20 does not have to be completely removed from the frame to remove the object being held. After the cassette, CD, or the like, has been removed, the security package may be used for another CD, cassette or the like.

To display an object the slide plate 20 is moved to the unlocked position. First, the user inserts the key protrusions 120-123 into the apertures 108, 109, 110 and 111 on the second member. Second, the user applies a uniform force to the key. The key's protrusions simultaneously contact the ends of the arms 76 and 72 of the T-shaped protrusions 70 and 74 and disengage the arms from the recesses 98, 99, 100 and 101 in the lateral walls 93, 94, 95, and 96. These arms act as levers and cannot be disengaged by prying or using an object other than the key which applies force to both ends of each arm. The second member 20 is then slid along the rails 62 and 60 towards the third wall 30 of the frame so that the lip 38 is no longer extending over a portion of the holding structure.

The object to be displayed is placed into the holding structure and is held in place by ledge 46 and bar 31. The security package can now be locked. Slide plate 20 is slid toward the object along the rails 60 and 62 until the arms 72 and 76 of the T-shaped protrusions 66 and 68 are engaged within the recesses 98, 99, 100 and 101 of the lateral walls 93, 94, 95 and 96. When the arms are so engaged, the lip 38 extends over a portion of the holding structure and object being held. The object cannot be removed without moving the slide plate 20 to the unlocked position or destroying the integrity of frame member 5.

The U-shaped portion 37 of the alternative embodiment is used to place the security package in display areas utilizing rack 40 as shown in FIGS. 1B and 2. The U-shaped portion 37 fits over the main stem of the rack 40. The cross bars 42 are spaced such to allow the top of the security package to be pivoted by consumers while the lower portion remains between two cross bars.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A locking structure for a conventional security package having a holding structure, said locking structure comprising:

(a) a first member having at least one lever arm with a first end, a second end and at least one rail;

(b) a second member, separate from said first member, said second member having a pair of aligned recesses to receive said first end and said second end of each said at least one lever arm, a lip extending from said second member, at least one rail slot for slidably engaging said at least one rail and a plurality of apertures adjacent to said recesses, said second member being slidable with respect to said first member between a locked position wherein each said at least one lever arm of said first member is in engagement with said recesses of said second member and said lip extends over said holding structure thereby retaining an object therein, and an unlocked position wherein each said at least one lever arm is not engaged within said recesses and said lip does not extend over said holding structure; and (c) a key means for unlocking an article from said holding structure.

2. The security locking structure of claim 1 wherein each said at least one lever arm is a cross arm of a T-shaped protrusion.

3. For use in conjunction with a conventional CD display basket, a display system for at least one article comprising:

(a) a rack, said rack comprising a bar, a plurality of cross-bars spaced along said bar, and means for attaching said rack to the conventional CD display basket:

(b) a security package having:

(1) a generally elongated rectangular frame structure;

(2) a holding structure for holding an article within said frame structure at a fist end of said frame structure, said holding structure having a first side;

(3) a security locking structure connected to said first side of said holding structure for locking an article within said holding structure, said security locking structure having:

(i) a first member having at least one lever arm with a first end and a second end, a first edge and at least (ii) a second member, separate from said first member, said second member having a pair of aligned recesses to receive said first end and said second end of each said at least one lever arm, a lip extending from said second member, at least one rail slot for slidably engaging said at least one rail and a plurality of protrusions having a grid shape with at least a pair of lateral walls, said recesses located in said at least a pair of lateral walls, a plurality of apertures in said second member adjacent to said recesses, said second member being slidable with respect to said first member between a locked position wherein each said at least one lever arm of said first member is in engagement within its respective aligned recesses of said second member and said lip extends over said holding structure thereby retaining an article therein and an unlocked position wherein each said at least one lever arm is not engaged within its respective aligned recesses and said lip does not extend over said holding structure; and a key means for unlocking an article from said holding structure.

4. The locking structure of claim 3 wherein said key means has a plurality of tines which simultaneously enter said plurality of apertures in said second member of said security locking structure and engage each said at least one lever arm to permit movement of each said at least one lever arm so that said second member can be slid from said locked position to said unlocked position.

5. A security package for holding an object comprising:

(a) a generally rectangular frame structure;

(b) a holding structure for holding an object within said frame at a first end of said frame;

(c) a locking structure connected to one end of said holding structure for locking an object within said holding structure, said locking structure having:
  (i) a first member having at least one T-shaped protrusion and at least one rail, said at least one T-shaped protrusion having a stem and a crossbar having a right leg and a left leg;
  (ii) a second member separate from said first member, said second member having a base, at least a pair of lateral walls, at least one wall perpendicular to said at least a pair of lateral walls, said lateral walls having aligned recesses, a lip extending from said second member parallel to said at least a pair of lateral walls, said base having an aperture adjacent to said at least a pair of lateral walls, a rail slot for engaging each said at least one rail of said first member and said second member being slidable with respect to said first member between a locked position wherein said at least one T-shaped protrusion of said first member is in engagement with said recesses of said second member and said lip extends over said holding structure thereby retaining an object therein and an unlocked position wherein said at least one T-shaped protrusion is not engaged with said aligned recesses and said lip does not extend over said holding structure;

(d) a key having a plurality of tines which engages said aperture adjacent toe each said at least a pair of lateral walls in said second member for disengaging said at least one T-shaped protrusion from engagement with said aligned recesses of said at least a pair of lateral walls when said tines simultaneously apply force to said right leg and said left leg of said at least one T-shaped protrusion.

6. For use in conjunction with a conventional CD display basket, a display system for at least one object comprising:
  (a) a rack, said rack comprising a bar, a plurality of cross bars spaced along said bar and means for attaching said rack to the conventional CD display basket;
  (b) at least one security package, said at least one security package having:
    (1) a generally elongated rectangular frame structure;
    (2) a holding structure for holding an object within said frame at a fist end of said frame structure;
    (3) a security locking structure connected to a first side of said holding structure for locking an object within said holding structure, said security locking structure having:
      (i) a first member having at least one T-shaped protrusion and at least one rail, said at least one T-shaped protrusion having a stem and a cross arm having a right end and a left end;
      (ii) a second member separate from said first member, said second member having a base, two parallel walls, at least a pair of lateral walls extending between said parallel walls, said at least a pair of lateral walls having aligned recesses, a lip extending from said base parallel to said parallel walls, said base having an aperture adjacent to each said at least a pair of lateral walls, a rail slot for engaging each said at least one guide rail of said first member;
      (iii) said second member being slidable with respect to said first member between a locked position wherein said at least one T-shaped protrusion of aid first member is in engagement with said recesses of said second member and said lip extends over said holding structure thereby retaining an object therein and an unlocked position wherein said at least one T-shaped protrusion is not engaged within said recesses and said lip does not extend over said holding structure; and
    (c) a kay having a plurality of tines which engages said plurality of apertures and said second member for disengaging said cross arm from engagement with said recesses of said lateral walls when said tines simultaneously apply force to said right end and said left end of said cross arms.

7. For use in conjunction with a conventional CD display basket, a display system for one or more articles comprising:
  (a) a rack, said rack comprising a bar, a plurality of cross-bars spaced along aid bar, and means for attaching said rack to the conventional CD display basket;
  (b) a security package having:
    ((1) a generally elongated rectangular frame structure;
    (2) a holding structure for holding an article within said frame structure and a first end of said frame structure and, said holding structure having a first side;
    (3) a security locking structure connected to said first side of said holding structure for locking an article within said holding structure, said security locking structure having a first member having at least one lever arm with a first end and a second end, and at least one rail;
    (4) a second member separate from said first member, said second member having a pair of aligned recesses to receive said first end and said second end of each said at least one lever arm, a lip extending from said second member, at least one rail slot for slidably engaging said at least one rail and a plurality of apertures adjacent to said recesses, said second member being slidable with respect to said first member between a locked position wherein each said at least one lever arm of said first member is in engagement within said aligned recesses of said second member and said lip extends over said holding structure thereby retaining an article therein, and an unlocked position wherein said at least one lever arm is not engaged within its respective aligned recesses and said lip does not extend over said holding structure; and
  (d) a key means for unlocking an article from said holding structure.

* * * * *